UNITED STATES PATENT OFFICE.

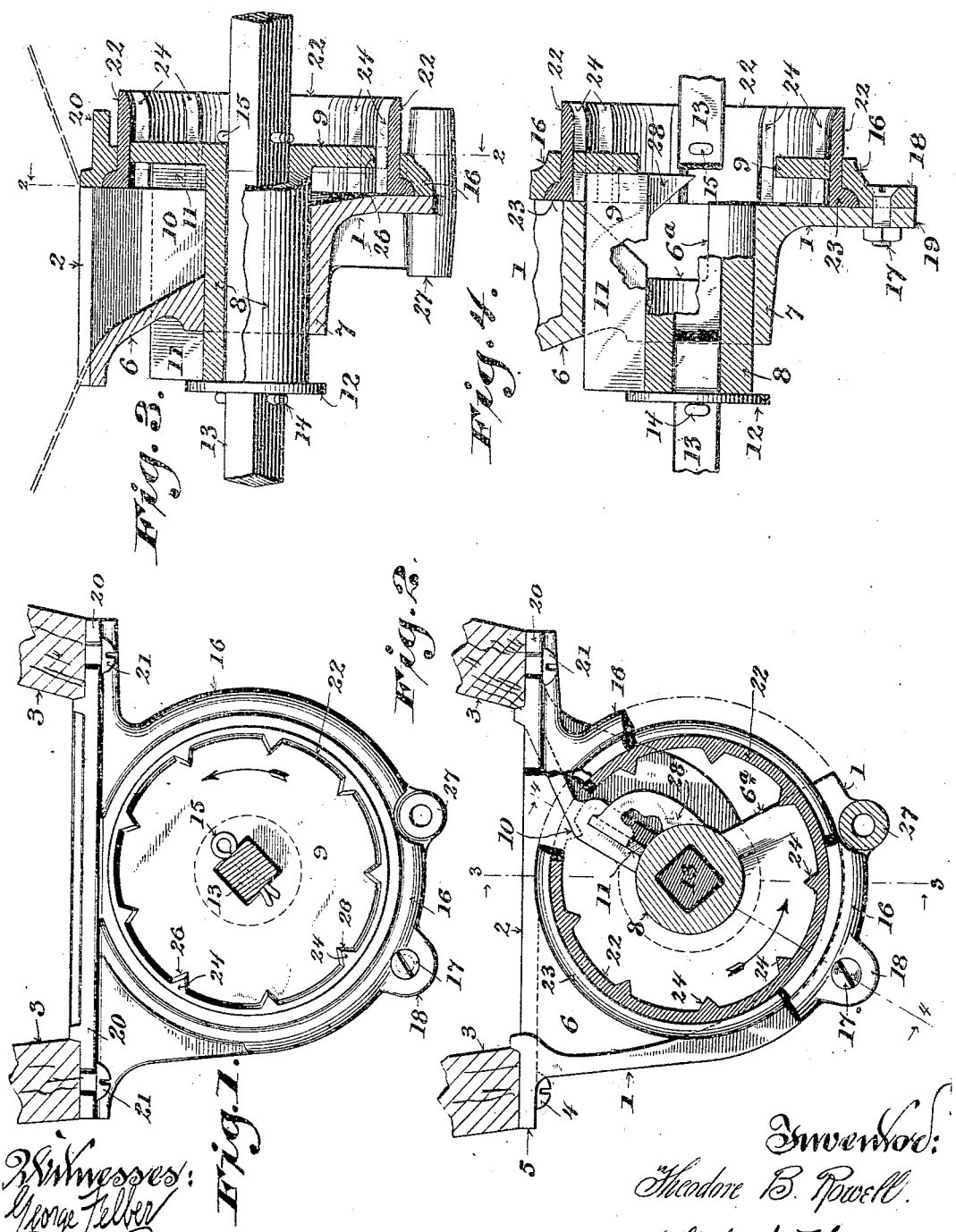

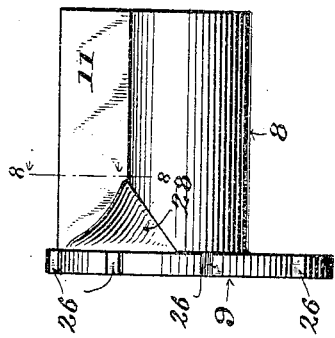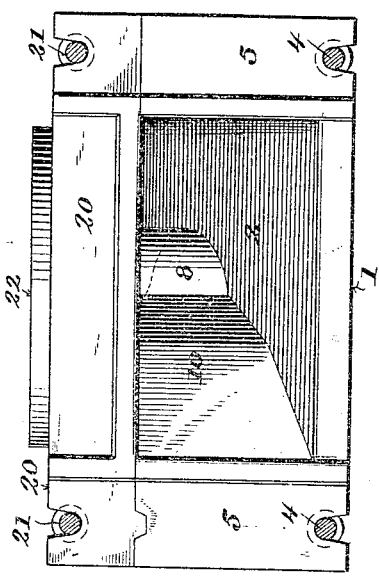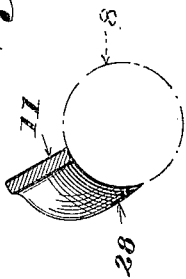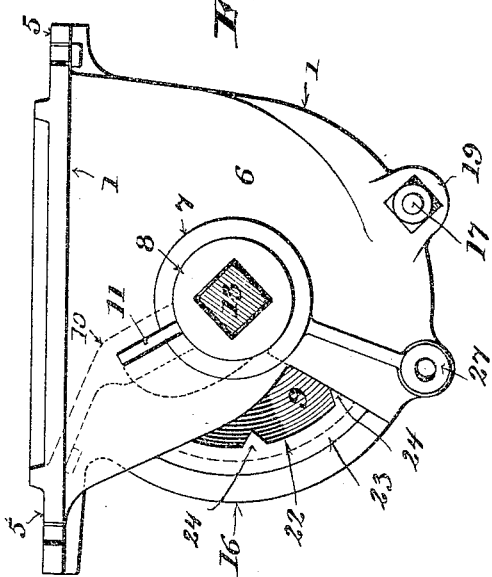

THEODORE B. ROWELL, OF BEAVER DAM, WISCONSIN.

FORCE-FEED SEEDER.

956,545.  Specification of Letters Patent.  Patented May 3, 1910.

Application filed June 8, 1908. Serial No. 437,220.

*To all whom it may concern:*

Be it known that I, THEODORE B. ROWELL, a citizen of the United States, and resident of Beaver Dam, in the county of Dodge and State of Wisconsin, have invented certain new and useful Improvements in Force-Feed Seeders; and I do hereby declare that the following is a full, clear, and exact description thereof.

The object of my invention is to provide a simple, durable and effective feed-mechanism especially applicable to seeder-drills, its arrangement and construction being such as to insure a uniform positive feed of greater or less capacity in the sowing of any variety of grain without change of speed.

Hence the invention consists in various structural features and combination of parts as clearly set forth hereinafter with reference to the accompanying drawings and subsequently claimed.

In the drawings: Figure 1 represents an end view of a cup embodying the features of my invention, the view being taken looking toward the closed side of the cup with the drive-shaft in section; Fig. 2, a sectional view of the same, as indicated by line 2—2 of Fig. 3, with parts broken away to more clearly illustrate the details of construction; Fig. 3, a longitudinal sectional view of the cup, as indicated by line 3—3 of Fig. 2 with portions broken away and other portions in full lines; Fig. 4, a similar sectional view taken upon a plane as indicated by line 4—4 of Fig. 2; Fig. 5, a plan view of the seed cup; Fig. 6, a face view of the same, said view being taken looking toward the open or discharge side thereof; Fig. 7, a detail elevation of an adjustable driving-disk or follower together with a non-rotatory gate which operates in conjunction therewith, and Fig. 8, a detail cross-section of the gate with the hub-portion of the disk indicated by dotted lines.

Heretofore seeders embodying the general principles employed in my improved device have been used in connection with grain drills, but owing to their multiplicity of parts, nicety of adjustment in such seeders becomes impractical due to wear, even though all of said parts in their manufacture are well fitted. My present invention therefore contemplates simplifying the mechanism by reducing the number of parts, and also rendering the device lighter and more accurate in feeding, the moving parts being so shaped and nested in the fixed housing as to avoid liability of damage to the seed due to breakage or cracking.

Referring by numerals to the drawings, 1 indicates a cup casing or circular shell which constitutes a grain pocket having a mouth-portion 2, the mouth-portion being secured to walls 3 of the usual grain-hopper by screws 4 arranged to pass through apertures in flange extensions 5 of the casing. A closed side 6 of the casing is formed with a radially disposed seed-discharge opening $6^a$ and a centrally apertured boss 7, which aperture constitutes a bearing for the hub 8 of a disk 9. The upper edge of the seed discharge consists of a radially disposed wall 10 which extends the entire width of the casing and forms one side of its grain pocket, the wall being longitudinally slotted for the reception of a rectangular gate-strip 11 that has its lower edge fitted upon the hub 8 of the disk against which disk the gate-strip abuts. End-play of the gate-strip is prevented upon the hub by a collar 12 which is fitted over a squared drive-shaft 13 and held against the end of said hub by a split-key 14 that is passed through an aperture of the shaft, there being a similar split-key 15 fitted through an aperture in said shaft adjacent to the outer face of the disk. The squared drive-shaft 13 passes through a loosely fitting squared opening in the disk-hub 8, said shaft being shown broken at both ends, but in practice this shaft is of such length as to extend through a series of seed cups, whereby rotary motion is imparted to their respective disks or feed wheels by a suitably arranged gearing, not shown. The cup casing opposite its closed side 6 is entirely open, its edges constituting a seat for a head 16 having an annular opening therein, which head is fitted thereto and held in place by a single retaining bolt 17 that passes through apertured ears 18, 19, one of which extends from the head and the other from the adjacent edge of said cup casing. This head conforms to the adjacent face of the cup-casing, being provided with upper flanges 20, which are in match-joint fit with the flanges 5 of the casing, the said head flanges being secured by suitable screws 21 to the side-walls 3 of the hopper. The head 16 together with the cup-casing constitutes a two part housing, said head at the same time forming a bearing for a ring 22 which is loosely mounted therein, the ring being provided with a circumferential retaining flange 23 that abuts the adjacent cup casing edge and is seated in an annular groove of said head. The ring has a series of internal V-shaped ribs 24 disposed longitudinally thereof, which ribs are engaged by a like series of V-shaped notches 26 in the edge of the disk 9. The ring is of sufficient width to permit considerable adjustment of the disk lengthwise thereof, which adjustment is limited in one direction by the face of said disk closing against the edge of the cup casing and in the opposite direction by the collar 12 contacting with the edge of the casing-boss 7, it being understood that longitudinal position of the aforesaid disk relative to the ring edges is obtained by predetermined set of the squared shaft, which shaft is capable of being slid in either direction.

From the foregoing description it will be seen that the disk and ring in effect constitute a seed-cup, closure for the open end of the housing, the disk being considered the cup-bottom, and by moving said disk inwardly or outwardly, the capacity of the cup can be varied in accordance with the quantity of seed to be sown or the variety thereof.

An apertured lug 27 which extends in either direction from the lower edge of the casing is provided for the purpose of attaching a seeder-boot or leg, not shown, which leg is designed to receive the grain as it is discharged from the seed cup.

Referring especially to Figs. 7 and 8, the outer face of the gate-strip 11 is provided with a curved stripper finger 28, which finger contacts with the adjacent face of the disk 9 and hugs its open portion, the finger being extended downwardly toward the lower edge of the seed-discharge opening where it terminates in a point having one side flanged therefrom backward to the gate-strip. The function of the stripper fingers is to prevent fine seed, in their discharge, from being carried upward by the disk-hub and ring, which would result in clogging or crushing and an uneven distribution.

In operation, the disk is set at a predetermined distance from the inner edge of the ring 22. Said disk together with the ring is then revolved in the direction of the arrows (as indicated in Figs. 1 and 2) causing the seed to be caught by the ribs of the ring and carried to the discharge opening of the cup casing or cup through which opening they are dropped. The opening or space between the disk and adjacent edge of the casing determines the quantity of seed to be sown, said space under all conditions being closed at the top by the gate-strip, which strip moves in conjunction with the disk and prevents seed from passing from the cup casing over the disk hub in a reverse direction from the feed.

By constructing the cup casing 1 and circular head 16 so as to form a housing for the movable parts, it will be observed that the ring which projects through said head may be of any desired width without change of the dimensions of the housing, and that the whole device is composed of only five parts including the gate-strip, the narrow bearing surface of the ring being such as to cause reduction of friction, while the loose fit of the driving-shaft permits self adjustment of all rotatory parts and thereby reduces the tendency of said parts to bind, thus the device in its assemblage will require slight accuracy of fit.

I claim:

1. A force-feed seeder comprising a drive-shaft, a revoluble disk provided with a hub carried by the shaft, notches in the face of the disk, a casing having an apertured bearing-boss for the disk hub and an open end, the casing being provided with a seed-discharge opening and a radially disposed guide-slot located to one side of the revoluble disk, a slidable gate-strip fitted in the casing guide-slot and adapted to have its lower edge in engagement with the hub-portion of the disk, a stripper-finger carried by the gate-strip in frictional contact with one face of said disk and arranged to partially encircle its hub, a flanged ring fitted to the open end of said casing, internal longitudinal ribs projecting from the ring for engagement with the notches of said disk, a head fitted over the flanged ring, and means for securing the head to the aforesaid casing.

2. A force-feed seeder comprising a drive-shaft, a disk provided with a hub carried by the shaft, notches in the face of the disk, a casing provided with a seed-discharge opening and a radially disposed guide-slot located to one side of the disk, a gate-strip fitted in the casing guide-slot and adapted to have its lower edge in engagement with the hub portion of the disk, a stripper-finger projecting from the gate-strip, the stripper being arranged to partially encircle said hub-portion of the disk, a ring loosely fitted over said disk, means in connection with the aforesaid disk and ring whereby the latter is rotated, and a bearing for the ring in connection with the casing.

3. A force-feed seeder having a cup-casing open at one side, a head having a circular opening secured to the face of the open side of the casing, the head being provided with a bearing surface comprising an uninterrupted inner annular countersunk groove intersected by an annular flat face parallel with the axis of the groove, said head and cup constituting a two-part housing, an internally ribbed ring having an external bearing surface conforming to the bearing surface of the head in which it is revolubly mounted, the bearing surface of the ring being wholly supported within the uninterrupted bearing surface of the head, a revoluble disk fitted within the ring and provided with notches for engagement with the internal ribs of said ring, and a rotatory driving shaft for the disk.

In testimony that I claim the foregoing I have hereunto set my hand at Beaver Dam in the county of Dodge, and State of Wisconsin in the presence of two witnesses.

THEODORE B. ROWELL.

Witnesses:
W. H. STACY,
E. D. STACY.